United States Patent [19]

Bauer et al.

[11] 3,928,378

[45] Dec. 23, 1975

[54] FUSED BICYCLIC AMINOPYRAZOLES

[75] Inventors: Victor J. Bauer, Somerville; Marc N. Agnew, Plainsboro; Richard C. Effland, Somerville, all of N.J.

[73] Assignee: American Hoechst Corporation, Bridgewater, N.J.

[22] Filed: Jan. 30, 1974

[21] Appl. No.: 437,992

[52] U.S. Cl.......... 260/310 R; 260/310 C; 424/273; 424/310 D
[51] Int. Cl.²...................................... C07D 231/54
[58] Field of Search......... 260/310 R, 310 C, 310 D

[56] References Cited
UNITED STATES PATENTS
3,520,901  7/1970  Massaroli........................ 260/310 R Primary Examiner—Donald B. Moyer
Attorney, Agent, or Firm—Curtis, Morris & Safford

[57] ABSTRACT

New fused bicyclic aminopyrazoles and their physiologically acceptable salts possessing anti-inflammatory and analgesic properties, and process for the preparation thereof. The compounds have the formula:

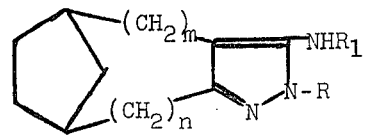

wherein R represents hydrogen, alkyl of 1–4 carbon atoms, phenyl or halophenyl; $R_1$ represents alkyl of 1–4 carbon atoms, cycloalkyl of 3–7 carbon atoms, phenyl or halophenyl, and n and m are 0 or 1.

4 Claims, No Drawings

FUSED BICYCLIC AMINOPYRAZOLES

This invention relates to fused bicyclic aminopyrazoles and their physiologically acceptable salts having anti-inflammatory and analgesic activity, and the process for preparation of above compounds.

To the best of our knowledge, the compounds of this invention have not heretofore been described. 3-aminotetrahydroindazole compounds of the formula:

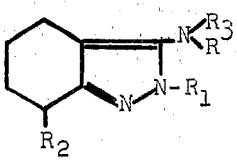

are mentioned in the U.S. Pat. No. 3,520,901, patented July 21, 1970, as possessing anti-inflammatory and analgesic properties.

The compounds of this invention have the formula:

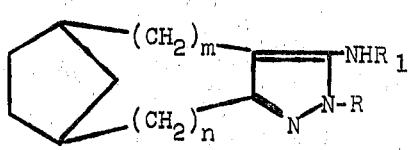

wherein R represents hydrogen, alkyl of 1-4 carbon atoms, phenyl or halophenyl; $R_1$ represents alkyl of 1-4 carbon atoms, cycloalkyl of 3-7 carbon atoms, phenyl or halophenyl, and n and m are 0 or 1.

The compounds of the present invention are prepared by reacting a bicycloketone of the formula:

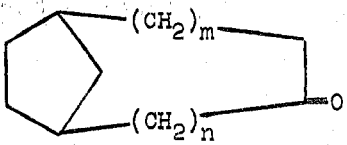

wherein m and n can be 0 or 1, with pyrrolidine, piperidine, or morpholine by heating and refluxing in a suitable solvent such as cyclohexane or toluene. The water formed is removed and the liquid which is left is distilled to provide a bicyclic enamine of the formula:

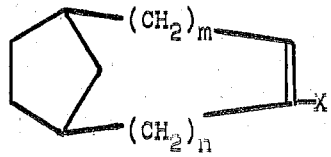

wherein X represents an N-pyrrolidino, N-piperidino or N-morpholino group. This bicyclic enamine is cooled to or below 0°C., the system is placed under an inert gas such as nitrogen, and an isothiocyanate $R_1NCS$ ($R_1$ represents alkyl of 1-4 carbon atoms, cycloalkyl of 3-7 carbon atoms, phenyl or halophenyl) is slowly added. The mixture is allowed to stand and is then triturated with a dialkyl ether to yield the corresponding 2-thiocarbamoyl-bicyclic enamine of the formula:

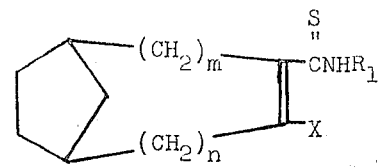

The above bicyclic thiocarbamoyl enamine is allowed to react with a hydrazine, $RHNNH_2$ (R represents H, alkyl of 1-4 carbon atoms, phenyl or halophenyl), in the presence of a suitable solvent such as ethanol with or without an acidic catalyst such as acetic acid at a temperature of from 25° to 150°C. for a time of 10 minutes to 24 hours to provide the fused bicyclic aminopyrazoles of this invention.

The compounds of the present invention are useful as anti-inflammatory agents and as analgesic agents in mammals. The anti-inflammatory activity of the compounds is demonstrated in the carrageenin-induced rat paw edema anti-inflammatory assay [Proc. Soc. Exptl. Biol. Med., 111, 544 (1962); J. Pharmacol. Exp. Ther., 141, 369(1963)]. For example, at doses 55, 75, 100 and 150 mg/kg of body weight, 5,8-methano-2-methyl-3-methylamino-2H-cyclohepta[c]pyrazole, 4,7-methano-2-methyl-3-methylamino-4,5,6,7-tetrahydro-2H-indazole, 4,7-methano-2-methyl-3-cyclohexylamino-4,5,6,7-tetrahydro-2H-indazole, and 4,7-methano-2-methyl-3-ethylamino-4,5,6,7-tetrahydro-2H-indazole, respectively, exhibit an approximately 50% inhibition of edema. The analgesic activity of the compounds is demonstrated in the 2-phenyl-1,4-benzoquinone-induced writhing test in mice, a standard assay for analgesia [Proc. Soc. Expl. Biol. Med., 95, 729 (1957)]. For example, at a dose of 13 mg/kg of body weight, 4,7-methano-2-methyl-3-methylamino-4,5,6,7tetrahydro-2H-indazole exhibits an approximately 50% inhibition of writhing. These data illustrate that compounds of this invention are useful as anti-inflammatory and analgesic agents at dosages of 1 to 150 mg/kg of body weight.

Examples of the compounds of the invention are:
4,7-methano-2-methyl-3-methylamino-4,5,6,7-tetrahydro-2H-indazole
4,7-methano-2-methyl-3-ethylamino-4,5,6,7-tetrahydro-2H-indazole
4,7-methano-2-methyl-3-propylamino-4,5,6,7-tetrahydro-2H-indazole
4,7-methano-2-ethyl-3-methylamino-4,5,6,7-tetrahydro-2H-indazole
4,7-methano-2-butyl-3-methylamino-4,5,6,7-tetrahydro-2H-indazole
4,7-methano-3-methylamino2H-4,5,6,7-tetrahydro-2H-indazole
4,7-methano-3-anilino-2H-4,5,6,7-tetrahydro-2H-indazole
4,7-methano-2-methyl-3-cyclohexylamino-4,5,6,7-tetrahydro-2H-indazole
4,7-methano-2-methyl-3-anilino-4,5,6,7-tetrahydro-2H-indazole
4,7-methano-2-methyl-3-(m-fluoroanilino)-4,5,6,7-tetrahydro-2H-indazole
4,7-methano-2-ethyl-3-(m-chloroanilino)-4,5,6,7-tetrahydro-2H-indazole
4,7-methano-2-methyl-3-(p-fluoroanilino)-4,5,6,7-tetrahydro-2H-indazole
4,7-methano-2-phenyl-3-anilino-4,5,6,7-tetrahydro-2H-indazole
4,7-methano-2-(p-fluorophenyl)-3-methylamino-4,5,6,7-tetrahydro-2H-indazole 4,7-methano-2-methyl-3-methylamino-2H-cyclohepta[c]pyrazole 4,7-methano-2-methyl-3-ethylamino-2H-cyclohepta[c]pyrazole 4,7-methano-3-ethylamino-2H-cyclohepta[c]pyrazole 5,8-methano-2-methyl-3-methylamino-2H-cyclohepta[c]pyrazole 5,8-methano-2-methyl-3-methylamino-2H-cycloocta[c]pyrazole The compounds of the present invention may be administered by any convenient route such as orally, intramuscularly, intravenously, subcutaneously, or intraperitoneally. The preferred route of administration is oral, for example, with an inert diluent or with an edible carrier or in gelatin capsules or tablets.

For the purpose of oral therapeutic administration, the active compounds of this invention may be incorporated with excipients and used in the form of tablets, troches, capsules, elixirs, suspensions, syrups, wafers, chewing gum, and the like. These preparations should contain at least 0.5% of active compound, but this may be varied depending upon the particular form and may conveniently be between 7% to about 70% by weight of the unit. The amount of active compound in such compositions is such that a suitable dosage will be obtained. Preferred compositions and preparations according to the present invention are prepared so that an oral dosage unit form contains between 10 and 200 milligrams of active compound.

The tablets, pills, capsules, troches, and the like may also contain the following ingredients: a binder such as gum tragacanth or gelatin; an excipient such as starch or lactose, a disintegrating agent such as alginic acid, potato starch and the like; a lubricant such as magnesium stearate; and a sweetening agent such as sucrose or saccharin may be added or a flavoring agent such as peppermint, methyl salicylate, or orange flavoring. When the dosage unit form is a capsule, it may contain, in addition to materials of the above type, a liquid carrier such as a fatty oil. Other dosage unit forms may contain other various materials which modify the physical form of the dosage unit, for example, as coatings. Thus, tablets or pills may be coated with sugar, shellac, or both. A syrup may contain, in addition to the active compounds, sucrose as a sweetening agent, and certain preservatives, dyes and colorings, and flavors. Materials used in preparing these various compositions must be pharmaceutically pure and non-toxic in the amounts utilized.

The preparation of typical compounds of the invention is described in the following examples, in which temperatures are in degrees C.

EXAMPLE 1

4,7-Methano-2-methyl-3-methylamino-4,5,6,7-tetrahydro-2H-indazole a. A solution of 100 g of norcamphor, 80 g of pyrrolidine, and 500 ml of cyclohexane was heated under reflux for 18 days; the water which separated was collected in a Dean-Stark trap. Removal of the solvent under reduced pressure left a liquid which was distilled to provide 2-pyrrolidinobicyclo[2.2.1]hept-2-ene, b.p. $(0.01_{mm})$ 51°–54°C.

b. 3.5 G of methylisothiocyanate were added slowly with stirring under nitrogen to 8.2 g of cold (−10°) 2-pyrrolidinobicyclo[2.2.1]hept-2-ene. The temperature rose to 40°, and the mixture solidified. Trituration with diisopropyl ether followed by recrystallization from acetonitrile and from ethyl acetate gave yellow needles, m.p. 143°–145°, of 2-methylthiocarbamoyl-3-pyrrolidinobicyclo[2.2.1]hept-2-ene.

c. A solution of 14.1 g of 2-methylthiocarbamoyl-3-pyrrolidinobicyclo[2.2.1]hept-2-ene, 27 ml of ethanol, 7.8 g of acetic acid, and 3.03 g of methylhydrazine was heated under reflux for 19 hours and concentrated to a yellow oil. The oil was diluted with water, and the mixture was made basic with sodium carbonate and extracted with chloroform. The chloroform solution was dried over sodium sulfate and concentrated to an oil. Chromatography followed by crystallization from hexane provided 4,7-methano-2-methyl-3-methylamino-4,5,6,7-tetrahydro-2H-indazole as colorless crystals, m.p. 77°–79°.

Analysis: Calc. for $C_{10}H_{15}N_3$: C, 67.76; H, 8.53; N, 23.71. Found: C, 67.56; H, 8.55; N, 23.98.

EXAMPLE 2

3-Ethylamino-4,7-methano-2-methyl-4,5,6,7tetrahydro-2H-indazole a. 8.7 g. of ethylisothiocyanate were added slowly to 16.3 g of cold (−10°) 2-pyrrolidinobicyclo[2.2.1]hept-2-ene with stirring under nitrogen. As the mixture solidified, 100 ml of isopropyl ether was added. Filtration and recrystallization from ethyl acetate gave yellow needles, m.p. 144°–146°, of 2-ethylthiocarbamoyl-3-pyrrolidinobicyclo[2.2.1]hept-2-ene.

b. A solution of 10 g of 2-ethylthiocarbamoyl-3-pyrrolidinobicyclo[2.2.1]hept-2-ene, 25 ml of ethanol, 5.2 g of acetic acid, and 2.07 g of methylhydrazine was refluxed for 20 hours and concentrated to a yellow oil which was diluted with water. The mixture was saturated with solid potassium carbonate and extracted with chloroform. The chloroform solution was dried over sodium sulfate and concentrated to a yellow oil which solidified to a yellow solid. Trituration with hexane followed by recrystallization from ethyl acetate provided 3-ethylamino-4,7-methano-2-methyl-4,5,6,7-tetrahydro-2H-indazole as colorless crystals, m.p. 123°–125°.

Analysis: Calc. for $C_{11}H_{17}N_3$: C, 69.07; H, 8.96; N, 21.97. Found: C, 68.90; H, 9.06; N, 22.27.

EXAMPLE 3

4,7-Methano-3-methylamino-4,5,6,7-tetrahydro-2H-indazole a. A solution of 16.5 g of 2-methylthiocarbamoyl-3-pyrrolidinobicyclo[2.2.1]hept-2-ene, 3.89 g of hydrazine hydrate, 31 ml of absolute ethanol, and 9.1 g of acetic acid was refluxed for 7, days then concentrated to a brown oil. The brown oil was diluted with water and extracted with chloroform. The choroform solution was dried over sodium sulfate and concentrated to a brown oil. Purification by column chromatography gave 4,7-methano-3-methylamino-4,5,6,7-tetrahydro-2H-indazole as an oil.

EXAMPLE 4

3-Cyclohexylamino-4,7-methano-2-methyl-4,5,6,7-tetrahydroindazole a. 14.1 G of cyclohexylisothiocyanate were added slowly to 16.3 g cold (−10°) 2-pyrrolidinobicyclo[2.2.1]hept-2-ene with stirring under nitrogen. The temperature of the mixture was allowed to rise to 20°, solidification began and 75 ml of isopropyl ether was added. Filtration followed by recrystallization from acetonitrile and then from cyclohexane gave yellow needles, m.p. 119°–121°, of 2-cyclohexylthiocarbamoyl-3-pyrrolidinobicyclo[2.2.1]hept-2-ene.

b. A solution of 6.1 g of 2-cyclohexylthiocarbamoyl-3-pyrrolidinobicyclo[2.2.1]hept-2-ene, 12 ml of ethanol, 2.6 g of acetic acid, and 1.0 g of methylhydrazine was refluxed for 4 days and concentrated to a yellow oil which was diluted with water. The mixture was saturated with solid potassium carbonate and extracted with chloroform. The chloroform solution was dried over sodium sulfate and concentrated to a dark oil. Chromatography followed by recrystallization from acetonitrile provided 3-cyclohexylamino-4,7-methano-2-methyl-4,5,6,7-tetrahydro-2H-indazole as colorless crystals, m.p. 135°–137°.

Analysis: Calc. for $C_{15}H_{23}N_3$: C, 73.42; H, 9.45; N, 17.13. Found: C, 73.21; H, 9.55; N, 17.19.

EXAMPLE 5

3-Anilino-4,7-methano-2-methyl-4,5,6,7-tetrahydro-2H-indazole a. 27 G of phenylisothiocyanate were added slowly to 32.6 of cold (0°) 2-pyrrolidinobicyclo[2.2.1]hept-2-ene with stirring under nitrogen. At onset of solidification, 200 ml of isopropyl ether were added. Filtration followed by recrystallization from acetonitrile gave yellow needles, m.p. 165°–167°, of 2-phenylthiocarbamoyl-3-pyrrolidinobicyclo[2.2.1]hept-2-ene.

b. A solution of 8.96 g of 2-phenylthiocarbamoyl-3-pyrrolidinobicyclo[2.2.1]hept-2-ene, 20 ml of ethanol, 3.9 g of acetic acid, and 15.2 g of methylhydrazine was refluxed for 5 hours and concentrated to a yellow oil which was diluted with water. The mixture was saturated with solid potassium carbonate and extracted with chloroform. The chloroform solution was dried over sodium sulfate and concentrated to a yellow oil. Crystallization from hexane provided 3-anilino-4,7-methano-2-methyl-4,5,6,7-tetrahydro-2H-indazole as a colorless solid, m.p. 113°–115°.

Analysis: Calc. for $C_{15}H_{17}N_3$ : C, 75.28; H, 7.16; N, 17.56. Found: C, 75.27; H, 7.03; N, 17.64.

EXAMPLE 6

3-(m-Fluoroanilino)-4,7-methano-2-methyl-4,5,6,7-tetrahydro-2H-indazole a. 10.0 G of 3-fluorophenylisothiocyanate were added slowly to 10.7 g of cold (−10°) pyrrolidinobicyclo[2.2.1]hept-2-ene with stirring under nitrogen. At onset of solidification, 100 ml of isopropyl ether were added. Filtration followed by recrystallization from ethyl acetate gave yellow needles, m.p. 159°–161°, of 2-(m-fluorophenyl)thiocarbamoyl-3-pyrrolidinobicyclo[2.2.1]hept-2-ene.

b. A solution of 7.3 g of 2-(m-fluorophenyl)thiocarbamoyl-3-pyrrolidinobicyclo[2.2.1]hept-2-ene, 13 ml of ethanol, 3.0 g of acetic acid, and 1.17 g of methylhydrazine was refluxed for 27 hours and concentrated to a yellow oil which was diluted with water. The mixture was saturated with solid potassium carbonate and extracted with chloroform. The chloroform solution was dried over sodium sulfate and concentrated to a yellow oil. Crystallization from hexane provided 3-(m-fluoroanilino)-4,7-methano-2-methyl-4,5,6,7-tetrahydro-2H-indazole as a colorless solid, m.p. 115°–117°.

Analysis: Calc. for $C_{15}H_{16}FN_3$: C, 70.02; H, 6.27; N, 16.33. Found: C, 70.07; H, 6.32; N, 16.41.

EXAMPLE 7

3-(p-fluoroanilino)-4,7-methano-2-methyl-4,5,6,7-tetrahydro-2H-indazole a. 15.3 G of 4-fluorophenylisothiocyanate were added slowly to 16.3 g of cold (−10°) 2-pyrrolidinobicyclo[2.2.1]hept-2-ene with stirring under nitrogen. At onset of solidification, 100 ml of isopropyl ether were added. Filtration followed by recrystallization from acetonitrile gave yellow needles, m.p. 158°–160°, of 2-(p-fluorophenyl)thiocarbamoyl-3-pyrrolidinobicyclo[2.2.1]hept-2ene.

b. A solution of 7.3 g of 2-(p-fluorophenyl)thiocarbamoyl-3-pyrrolidinobicyclo[2.2.1]hept-2-ene, 13 ml of ethanol, 3.0 g of acetic acid, and 1.17 g of methylhydrazine was refluxed for 22 hours and concentrated to a yellow oil which was diluted with water. The mixture was saturated with solid potassium carbonate and extracted with chloroform. The chloroform solution was dried over sodium sulfate and concentrated to give an off-white solid which was recrystallized from hexane to yield 3-(p-fluoroanilino)-4,7-methano-2-methyl-4,5,6,7-tetrahydro-2H-indazole as a colorless solid, m.p. 135°–137°.

Analysis: Calc. for $C_{15}H_{16}FN_3$: C, 70.02; H, 6.27; N, 16.33. Found: C, 70.46; H, 6.15; N, 16.54.

EXAMPLE 8

3-Anilino-4,7-methano-2-phenyl-4,5,6,7-tetrahydroindazole a. A solution of 8.96 g of 2-phenylthiocarbamoyl-3-pyrrolidinobicyclo[2.2.1]hept-2-ene, 20 ml of ethanol, 3.9 g of acetic acid and 3.57 g of phenylhydrazine was refluxed for 8 days and concentrated to a brown oil which was diluted with water. The mixture was saturated with solid potassium carbonate and extracted with chloroform. The chloroform solution was dried over sodium sulfate and concentrated to a brown oil. Crystallization from ether followed by recrystallization from acetonitrile provided 3-anilino-4,7-methano-2-phenyl-4,5,6,7-tetrahydro-2H-indazole as colorless crystals, m.p. 173°–174°.

Analysis: Calc. for $C_{20}H_{19}N_3$: C, 79.70; H, 6.35; N, 13.94. Found: C, 79.96; H, 6.32; 14.09.

EXAMPLE 9

4,7-Methano-2-methyl-3-methylamino-2H-cyclohepta[c]pyrazole a. A solution of 100 g of bicyclo[3.2.1]octan-3-one, 69 g of pyrrolidine, and 500 ml of cyclohexane was heated under reflux for 3 days; the water which separated was collected in a Dean-Stark trap. Removal of the solvent under reduced pressure provided 3-pyrrolidinobicyclo[3.2.1]oct-2-ene as a red viscous oil.

b. 3.66 G of methylisothiocyanate were added slowly to 8.86 g of cold (0°) 3-pyrrolidinobicyclo[3.2.1]oct-2-ene with stirring under nitrogen. On warming to room temperature, solidification began and 25 ml of isopropyl ether were added. Filtration and recrystallization from acetonitrile gave yellow needles, m.p. 158°–160°, of 2-methylthiocarbamoyl-3-pyrrolidinobicyclo[3.2.1]oct-2-ene.

c. A solution of 14.9 g of 2-methylthiocarbamoyl-3-pyrrolidinobicyclo[3.2.1]oct-2-ene, 50 ml of ethanol, 10 g of acetic acid, and 3.04 g of methylhydrazine was refluxed for 20 hours and concentrated to an orange oil. The oil was diluted with water, saturated with potassium carbonate and extracted with ether. The ether solution was dried over sodium sulfate and concentrated to an orange oil. Crystallization from ether-hexane followed by sublimation provided 4,7-methano-2-methyl-3-methylamino-2H-cyclohepta[c]pyrazole as colorless crystals, m.p. 115°–117°.

Analysis: Calc. for $C_{11}H_{17}N_3$: C, 69.07; H, 8.96; N, 21.97. Found: C, 69.34; H, 9,14; N, 22.02.

EXAMPLE 10

3-Ethylamino-4,7-methano-2-methyl-2H-cyclohepta[c]pyrazole a. 20.8 G of ethylisothiocyanate were added slowly to 44.4 g of 3-pyrrolidinobicyclo[3.2.1]oct-2-ene with stirring under nitrogen. On warming to 40°, solidification began and 100 ml of isopropyl ether were added. Filtration and recrystallization from acetonitrile gave yellow needles, m.p. 127°–128°, of 2-ethylthiocarbamoyl-3-pyrrolidinobicyclo[3.2.1]oct-2-ene.

b. A solution of 12 g of 2-ethylthiocarbamoyl-3-pyrrolidinobicyclo[3.2.1]oct-ene, 21 ml of ethanol, 5.9 g of acetic acid, and 2.3 g of methylhydrazine was refluxed for 24 hours and concentrated to a yellow oil. The oil was diluted with water, saturated with sodium carbonate, and extracted with ether. The ether solution was dried over sodium sulfate and concentrated to a yellow oil. Crystallization from cold (−78°) ether-hexane and trituration with cold (−78°) ether provided 3-ethylamino-4,7-methano-2-methyl-2H-cyclohepta[c]pyrazole as a colorless solid, m.p. 121°–122°.

Analysis: Calc. for $C_{12}H_{19}N_3$: C, 70.20; H, 9.33; N, 20.47. Found: C, 70.07; H, 9.43; N, 20.61.

EXAMPLE 11

3-Ethylamino-4,7-methano-2H-cyclohepta[c]pyrazole a. A solution of 11.9 g of 2-ethylthiocarbamoyl-3-pyrrolidinobicyclo[3.2.1]oct-2-ene, 21 ml of ethanol, 5.2 g of acetic acid and 2.51 g of hydrazine hydrate was refluxed for 28 hours and concentrated to a yellow oil. The oil was diluted with water, saturated with potassium carbonate, and extracted with ether. The ether solution was dried over sodium sulfate and concentrated to a yellow oil. Crystallization from hexane followed by recrystallization from acetonitrile and ethyl acetate provided 3-ethylamino-4,7-methano-2H-cyclohepta[c]pyrazole as colorless crystals, m.p. 123°–124°.

Analysis: Calc. for $C_{11}H_{17}N_3$: C, 69.07; H, 8.96; N, 21.97. Found: C, 69.14; H, 9.07; N, 21.80.

EXAMPLE 12

5,8-Methano-2-methyl-3-methylamino-2H-cyclohepta[c]pyrazole a. A solution of 25 g of bicyclo[3.2.1]octan-2-one, 17.8 g of pyrrolidine and 125 ml of cyclohexane was refluxed for 4 hours. The water which separated was collected in a Dean-Stark trap. Removal of the solvent under reduced pressure provided 2-pyrrolidinobicyclo[3.2.1]oct-2-ene as a dark orange viscous oil.

b. 14.75 G of methylisothiocyanate were added slowly to 35.8 g of cooled (−20°) 2-pyrrolidinobicyclo[3.2.1]oct-2-ene with stirring under nitrogen. The reaction mixture was warmed to 40° and began to solidify when 100 ml of isopropyl ether were added. Filtration followed by recrystallization from ethyl acetate gave 3-methylthiocarbamoyl-3-pyrrolidinobicyclo[3.2.1]oct-2-ene as yellow needles, m.p. 152°–154°.

c. A solution of 10 g of 3-methylthiocarbamoyl-2-pyrrolidinobicyclo[3.2.1]oct-2-ene, 2.03 g of methylhydrazine, 35 ml of absolute ethanol and 7 g of acetic acid was refluxed under nitrogen for 2 hours, concentrated to a yellow oil which was diluted with water, saturated with solid potassium carbonate and extracted with ether. The ether solution was dried with sodium sulfate and concentrated to a yellow oil. Crystallization from hexane followed by recrystallization from acetonitrile provided 5,8-methano-2-methyl-3-methylamino-2H-cyclohepta[c]pyrazole as a colorless crystalline solid, m.p. 106°–107°.

Analysis: Calc. for $C_{11}H_{17}N_3$: C, 69.07; H, 8.96; N, 21.97. Found: C, 68.67; H, 8.93; N, 21.90.

We claim:

1. A compound of the formula

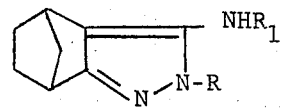

in which R is hydrogen, alkyl of 1–4 carbon atoms, phenyl or halophenyl and $R_1$ is alkyl of 1–4 carbon atoms, cycloalkyl of 3–7 carbon atoms, phenyl or halophenyl.

2. The compound defined in claim 1 which is 4,7-methano-2-methyl-3-methylamino-4,5,6,7-tetrahydro-2H-indazole.

3. The compound defined in claim 1 which is 4,7-methano-2-methyl-3-cyclohexylamino-4,5,6,7-tetrahydro-2H-indazole.

4. The compound defined in claim 1 which is 4,7-methano-2-methyl-3-ethylamino-4,5,6,7-tetrahydro-2H-indazole.

* * * * *